Figures 1, 2:
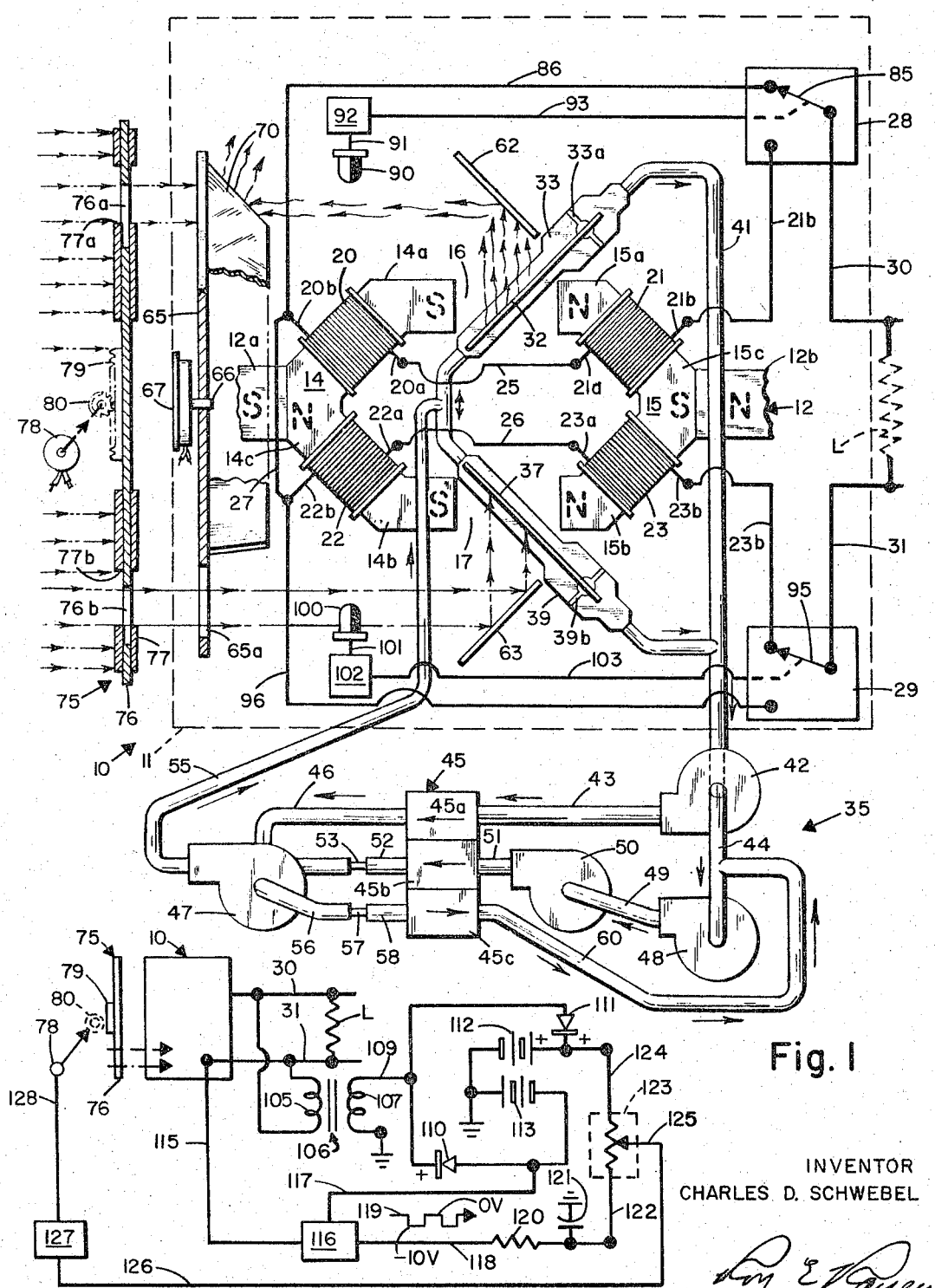

Jan. 23, 1968    C. D. SCHWEBEL    3,365,652

THERMO-ELECTRIC CONVERSION APPARATUS

Filed April 10, 1963

INVENTOR
CHARLES D. SCHWEBEL

ATTORNEY 3,365,652
THERMO-ELECTRIC CONVERSION APPARATUS
Charles D. Schwebel, Cocoa Beach, Fla. 32931
Continuation-in-part of application Ser. No. 106,582,
May 1, 1961. This application Apr. 10, 1963, Ser.
No. 272,070
15 Claims. (Cl. 322—2)

This invention relates to apparatus for converting radiant energy, such as solar infra-red energy, into usable electrical energy. More particularly the invention is directed to the generation of electricity in a conductor, such as an induction coil, by utilizing the zero magnetic permeability exhibited by metals, such as niobium when in their superconducting state to vary the flux intensity of a magnetic field in which the conductor is disposed. This application is a continuation-in-part of my copending application Ser. No. 106,582, filed May 1, 1961.

It is a principal object of the invention to provide a novel and effective apparatus which is well suited to the thermoelectric conversion of energy in space environments such as are encountered by artificial earth satellites, space probing rockets and interplanetary vehicles, particularly those environmental characteristics of space which make it possible to attain extremely low temperatures, at which low temperatures certain metals experience a transition to a superconducting state in which their magnetic permeability is reduced substantially to zero. The transition of a material, which is subjected to a given magnetic field, from the normal state to the superconducting non-permeable state has the effect of "pushing out" the lines of magnetic flux so that they do not pass through the superconducting material but take a longer flux path around the superconductor. This change in the flux path is known as the Meissner effect. If a quantity of heat is then applied to the superconducting material, sufficient to bring about transition to its normal state, the magnetic field will again permeate the material and hence follow a shortened flux path. The transitions between normal and superconducting states take place within a very small temperature interval, and relatively pure materials have a broad S-shaped transition curve (permeability versus temperature) indicating a latent heat of transition with at least a portion of the energy being utilized in changing the effective length of the flux path without contributing to a change in temperature of the transition material. It is this variation of magnetic flux which the present invention employs in the generation of usable electricity. Of course the change in flux under an inductive load will be opposed in accordance with Lenz's law, and it can be expected that when under load a greater portion of the input energy will be utilized in effecting the flux change than would be represented by the latent heat of transition alone when measured in a magnetic field in which flux changes are unopposed by inductive loading.

It is another object of this invention to utilize the coldness of space and the radiation of the sun to alternately drive an element, which is in the path of magnetic flux, into and out of superconductive states, respectively lengthening and shortening the path of magnetic flux so as to increase and decrease the intensity of a magnetic field in which an induction coil is disposed, thereby causing a flow of usable electric current in that coil.

In the practice of the invention there is provided at least one induction coil having a core forming part of a magnetic flux path to the field of which the coil is subjected, an element formed of material capable of transition to a superconducting state, such as niobium, forms part of the flux path when in a normal state and acts to divert and lengthen the flux path when in a superconducting state, there being provided chopper means for alternately shielding the element from incoming radiation while permitting it to give up heat to its colder surroundings, and admitting radiation such as sunlight thereto so as to effect alternation of the element between normal and superconductive states, and means for driving the chopper at a speed determinative of the frequency of the transition cycles of the superconductive element. In those environments where direct radiation from the element to colder space is insufficient for the element to become superconductive or to attain the desired frequency in changes of state, the invention contemplates the provision of auxiliary cooling means, for example a refrigeration system for directing liquid helium over the surface of the element.

Yet another object of this invention is the provision of an electric current generator of the foregoing character either with or without the refrigerating means comprising means such as an energy responsive switch means for open circuiting the induction coil during transition of the element to its superconductive state, whereby the transition to superconductivity is under a substantially no-load condition (other than that imposed by a permissive, below critical flux provided by magnet means). In apparatus utilizing a plurality of superconductive elements and associated coil means, the invention further contemplates alternatively open circuiting each coil means as its respective element undergoes transition to superconductivity and connecting the coil means to a useful load during transition of its element to its permeable state. By selectively connecting the coil means in opposite or like orientation with respect to a load either alternating or direct current may be obtained.

Other objects and advantages of the energy conversion apparatus of this invention will become apparent from the following detailed description thereof, taken in conjunction with the accompanying sheet of drawings forming a part of this specification, and in which:

FIG. 1 is a schematic illustration of a thermo-electric energy conversion apparatus embodying this invention; and FIG. 2 is a schematic diagram of a control circuit for the apparatus of FIG. 1.

In the form of the invention described hereinafter there is provided a thermo-electric conversion apparatus, hereafter referred to as converter 10, comprising a housing 11 which is shown schematically and may be of any suitable known construction compatible with a desired environment such as is encountered by satellites in orbit about the earth.

Within housing 11 there is located a permanent magnet 12, only the opposed South and North poles 12a and 12b of which are shown. A generally U-shaped laminated pole piece 14, having leg portions 14a and 14b has its medial portion 14c in engagement with the south pole 12a of permanent magnet 12. A similar laminated pole piece 15 has its medial portion 15c in engagement with the north pole 12b of permanent magnet 12 and has its leg portions 15a and 15b in spaced opposed relation to legs 14a and 14b, respectively, of pole piece 14. Pole pieces 14 and 15 provide a divided flux path for the flow of magnetic flux between the north and south poles of magnet 12, and it will be recognized that the pole pieces will exhibit induced magnetism characterized by a south pole at each of legs 14a, 14b and a north pole at each of legs 15a and 15b. The spaces between these opposed legs of the pole pieces provide air gaps 16 and 17 in the branches of the flux path, and these gaps are carefully equalized so that the flux density through each will be substantially the same.

A plurality of induction coils 20, 21, 22 and 23 are mounted on the pole piece legs 14a, 15a, 14b and 15b, respectively, so that the pole pieces form a laminated core for each of the coils. The coils are preferably formed of a number of turns of insulated copper wire in the manner of a solenoid winding, and it will be recognized that each coil will be disposed in a magnetic field associated with its respective pole piece leg. Coils 20 and 21 are wound in the same direction and have their leads 20a and 21a connected by a conductor 25 to form a first pair of coils subject to that portion of the permanent magnet flux passing through the flux path formed by legs 14a, gap 16 and leg 15a. Similarly, coils 22 and 23 are wound in the same direction and have their leads 22a and 23a connected by a conductor 26 to form a second pair of coils which is subject to the permanent magnet flux passing through the path formed by legs 14b, air gap 17 and leg 15b. Coils 20 and 22 have their other leads 20b and 22b connected together by a conductor 27, while coils 21 and 23 have their other leads 21b and 23b connected through electronic switch means or relays 28 and 29 to first and second output conductors 30 and 31, respectively. The functioning of these induction coils, relays, and their respective connections will become apparent as the description proceeds.

In the air gap 16 between pole piece legs 14a and 15a, there is disposed a plate 32 of a material such as niobium metal, which is capable of undergoing a transition to a superconducting, non-magnetically permeable state when subjected to a temperature below the transition temperature for that material when disposed in the magnetic field between pole pieces 14 and 15. Plate 32 is disposed at an angle of approximately 45° to the normal flux path therebetween and also to lie in the path of energy emanations from a source outside the flux path. Plate 32 is supported in a transparent cooling jacket 33, such as of quartz, by struts 33a fused to the plate. Jacket 33 forms part of a refrigeration system, generally indicated at 35, which is used to aid in cooling plate 30 to its temperature of transition to the superconducting state during such times as the converter 10 is not within an environment, such as cold, black outer space, wherein the transition temperature can be maintained by simple radiation from the plate to the space environment. A plate 37, similar to plate 32, is disposed in air gap 17 in the flux path between pole piece portions 14b and 15b and is supported in a cooling jacket 39 by struts 39a thereof at an angle of approximately 45° to the normal flux path between the pole pieces. Jacket 39, like jacket 33, is preferably formed of a transparent material such as quartz and forms part of the mentioned refrigeration system 35.

Refrigeration system 35 contemplates the use of a coolant such as liquid helium circulated through jackets 33 and 39 to effect cooling of niobium plates 32 and 37 to a temperature at which the plates will become superconducting, the refrigeration system itself being of any well known construction. In the form of refrigeration system shown herein, there is provided a cascade arrangement by which helium may be liquified and passed through jackets 33 and 39 in which the helium takes on heat from the plates 32 and 37 and in so doing is partially vaporized. The combined liquid and vapor is carried away from jackets 33 and 39 by a coolant return tube or line 41 which is connected to a centrifugal separator 42 in which the liquid and vapor are separated and passed on through lines 43 and 44 respectively. Separator 42 is of the centrifugal type so that the refrigeration system may operate when free of gravitational effects, as when converter 10 is utilized in an earth orbiting satellite. Liquid helium is conducted by line 43 into section 45a of a heat exchanger 45 wherein the liquid takes on heat and is partially vaporized and passes as liquid and vapor through a line 46 to a second centrifugal separator 47.

Helium vapor passing from separator 42 through line 44 is pumped by a vapor pump 48 through line 49 to a compressor 50 where the vapor is compressed and passed to section 45b of heat exchanger 45 via line 51. The vapor entering heat exchanger 45 from line 51 is cooled by the transfer of heat to the liquid helium passing through section 45a and is then passed by a line 52 through an expansion valve 53 and into separator 47. Expansion of the helium vapor at expansion valve 53 converts the vapor at least in part to liquid helium as it enters separator 47. Separator 47 removes the liquid helium for transmission via line 55 to the cooling jackets 33 and 39 for cooling of plates 32 and 37, while the vapor from separator 47 is passed through line 56, a flow regulating valve 57, and line 58 into section 45c of heat exchanger 45. The vapor passing through heat exchanger section 45c aids in cooling the vapor passing through section 45d from compressor 50 and thence passes through line 60 to the vapor return line 44 leading into centrifugal separator 48 to complete the refrigeration circuit.

Niobium plates 32 and 37 are adapted to be intermittently heated, or subjected to heat energy, such as infra-red radiant solar energy. This is accomplished by providing reflecting surfaces such as mirrors 62 and 63 adjacent the jacketed plates 32 and 37 so as to direct infra-red emanations entering converter housing 11 from the left as viewed in the drawings, against the plates, and by interrupting the beam of emanations by means such as a rotating chopper wheel 65. Chopper wheel 65 may be supported for rotation with the output shaft 66 of a drive motor 67 and comprises a suitable opening 65a which permits the heat energy emanations, such as from the sun, to pass and be reflected by mirror 63 against plate 37, while the body of disc 65 prevents such emanations from reaching mirror 62 and plate 32. Conversely, when opening 65a is aligned with mirror 62 infra-red emanations are directed against plate 32 and plate 37 is shielded therefrom. Accordingly, the plates 32 and 37 may be said to have alternating dark and light periods, the frequency of which is determined by the rate of rotation of chopper wheel 65.

It will be recognized that during the light periods the plates 32 and 37 tend to be heated by the infra-red emanations falling thereon while during their dark periods they will radiate heat emanations to the surrounding space environment. A portion of a frusto-conical mirror 70 is suitably mounted on the right hand side of chopper wheel 65 so that heat emanations from plates 32 and 37 during their dark periods will be reflected by their respective mirrors 62 and 63 and by frusto-conical mirror 70 into outer space environment for dissipation and will not be directed against chopper wheel 65, or other parts of the converter which would be heated thereby and tend to reduce the efficiency of the apparatus.

An iris mechanism generally indicated at 75, is provided for varying the amount of solar radiation or other heat energy emanations, which are permitted to enter converter 10 and be directed against plates 32 and 37. Iris mechanism 75 may be of any well known construction but is schematically shown herein as comprising a movable plate or slide 76, having apertures 76a and 76b which cooperate with apertures 77a and 77b in guide means 77 in which slide 76 is reciprocable. A servo motor 78 is connected to slide 76 through rack and pinion means 79 and 80, and serves to adjustably position slide 76 to vary the amount of radiation entering converter 10 in accordance with feed-back signals from the output of the converter in a manner more fully described as the specification proceeds.

In the present example, permanent magnet 12 provides a field strength in gaps 16 and 17 between pole pieces 14 and 15 of approximately 1700 gauss each. Niobium metal, when subject to a field strength of 1700 gauss, has a temperature of transition from the normal permeable state to a superconducting non-permeable state of approximately 5° K. Upon transition from the normal to superconducting state, effected as by radiation to the space environment and/or by the cooling effect of liquid helium in the cooling jackets 33 and 39, the niobium plates 32 and 37 have the effect of "pushing out" the lines of force and causing them to take a longer path around the superconducting plates. This "pushing out" effect of superconducting material is known as the Meissner effect and a fuller understanding of the nature thereof may be had by reference to discussions thereof in a work entitled "Superconductivity" by D. Shoenberg, published by the Cambridge University Press, 1952 ed.; and a work entitled "Cryogenic Engineering" by Russell B. Scott and copyrighted in 1959 by D. Van Nostrand Co., Inc.

Experiments have shown that materials such as niobium, tin, and the like, may be blocked from transition from a normal to a superconductive non-permeable state, regardless of temperature reduction, when permeated by magnetic flux of greater than a maximum permissive density which, of course, is different for different materials. The present embodiment of the invention includes means, the operation of which will presently be more fully described, for insuring against the presence of a flux density greater than the permissive density of the elements 32 and 37, for example due to back E.M.F. in the coils 20, 21, 22, 23, or in an inductive load during the respective transitions of the elements 32 and 37 from their normal to superconducting states. To this end, there is provided means for temporarily open circuiting the pair of coils 20, 21 when element 32 is undergoing transition to superconductivity and for temporarily open circuiting the pair of coils 22, 23 when element 37 is undergoing transition from its normal to its superconductive state.

The open circuiting means for coils 20 and 21 includes the electronic switch or relay 28 which comprises a switch member 85 for alternatively connecting the output conductor 30 to the coil lead 21b or to a conductor 86 leading to the junction of conductor 27 and coil lead 20b. The actuation of switch 28 is controlled by a photo-electric cell 90 disposed between the chopper 65 and mirror 62, with an energy sensitive side oriented to receive heat or light energy passed by the chopper toward the mirror. The photo-electric cell has its non-sensitive side directed toward the mirror 62, and the cell is connected to deliver an output signal via a conductor 91 to amplifier means 92, which in turn has its output connected through conductor means 93 to the relay 28.

When the photo-electric cell is activated by energy, its signal is amplified by amplifier 92 and utilized to shift the switch member 85 to connect the coil lead 21b to the output line 30. However, when the photo-electric cell 90 is in darkness, the switch member returns to a position open circuiting coils 20 and 21, and connecting coil lead 22b to the output conductor 30 through conductors 27 and 86 as shown.

The open circuiting means for coils 22 and 23 is similar to that for coils 20 and 21 and includes the electronic switch or relay 29 which comprises a switch member 95 for alternatively connecting the output conductor 30 to the coil lead 23b or to a conductor 96 leading to the junction of conductor 27 and coil lead 22b. The actuation of switch 29 is controlled by a photo-electric cell 100 disposed between the chopper 65 and mirror 63, with an energy sensitive side oriented to receive heat or light energy passed by the chopper toward that mirror. The photo-electric cell 100 has its non-sensitive side directed toward the mirror 63, and the cell is connnected to deliver an output signal via a conductor 101 to amplifier means 102, which in turn has its output connected through conductor means 103 to the relay 29.

When the photo-electric cell 100 is activated by radiant energy, its signal is amplified by amplifier 102 and utilized to shift the switch member 95 to connect the coil lead 22b to the output line 31, as shown. However, when the photo-electric cell 100 is in darkness, the switch member 95 returns to a position open circuiting coils 22 and 23, and connecting coil lead 20b to the output conductor 31 through conductors 27 and 96.

In the operation of the converter 10, chopper wheel 65 is driven at a rotational frequency equaling the desired frequency of alternating current which will appear at output lines 30 and 31. When niobium plate 32 is shielded from heat energy such as solar radiation by chopper wheel 65, it gives up heat by radiation to the space environment and/or by contact with the liquid helium in cooling jacket 33, and is thereby driven to its superconducting state causing the lines of flux coursing from pole piece leg 15a to leg 14a to follow an elongated flux path around the superconducting plate. The magnetic field to which induction coils 20 and 21 are subjected is thereby reduced or collapsed. During this transition of plate 32, the photoelectric cell 90 is dark, and the coils 20, 21 are open circuited, thereby permitting the transition to superconductvity under a no load condition and with plate 32 subject only to the permissive flux density established by the magnet 12. At the same time, niobium plate 37 will absorb radiant energy passing through iris means 75 and chopper wheel opening 65a and be driven from its superconducting state to its normal state, thereby permitting the lines of force coursing from pole piece leg 15b to pole piece leg 14b to follow the shorter flux path through the now permeable niobium plate 37. The shortening of the flux path between leg portions 15b and 14b will be accompanied by a corresponding expansion of the magnetic field to which coils 22 and 23 are subjected. Because during this transition photo-electric cell 100 causes relay 29 to connect lead 23b to conductor 31 while relay 28 connects lead 22b to conductor 30, the expanding magnetic field induces a flow of current in coils 22 and 23 in one direction thereby causing a current flow in leads 30 and 31, and whatever load L which may be connected thereto, which represents one-half of an alternating current cycle.

As chopper wheel 65 rotates and opening 65a thereof is brought into alignment with iris opening 76a and with mirror 62, superconducting niobium plate 32 will be subjected to radiant energy and, upon absorbing heat equivalent to the latent heat of transition therefor, will be driven to its normal permeable state. As plate 32 undergoes the transition to its normal state the flux path between legs 15a and 14a will be reduced or shortened causing a corresponding expansion of the lines of force in the magnetic field to which coils 20 and 21 are subjected. Because photoelectric cell 90 causes relay 28 to connect coils 20 and 21 to conductor 30 while lead 20b is connected to conductor 31, and because relay 29 open circuits coils 22 and 23 during the transition of plate 32 to its normal state, the expanding field will tend to induce a flow of current in the conductors of coils 20 and 21, and in conductors 30 and 31 in a direction opposite to that which was induced therein upon transition of plate 37 to its normal or permeable state. At the same time niobium plate 37 will be shielded from solar radiation by chopper wheel 65 and will give up heat by radiation to space and/or contact with liquid helium in its jacket 39, and will therefore be driven to its superconducting state in which the flux path between pole piece legs 15b and 14b is lengthened. Although lengthening of this flux path will cause a corresponding change in the field to which coils 22 and 23 are subjected, it is under no load conditions because the relay 29 holds these coils open circuited during the transition.

It will be recognized, therefore, that as chopper wheel 65 alternately shields plates 32 and 37 from radiation they will be alternately cycled between their normal and their superconducting states and cause such variations in the flux paths between pole pieces 14 and 15 as to induce an alternating current which will be apparent at the output conductors 30 and 31.

The transition temperatures at which a material such as the niobium plates 32 and 37 will become superconducting is determined in part by the strength of the magnetic field to which the material is subjected. That is to say, if the field strength is increased above a critical value for a given transition temperature, a superconductor will be rendered non-superconducting, or conversely, a normal material will be prevented from becoming superconducting at that temperature. Inasmuch as the Meissner effect is in the nature of a pushing out of the lines of magnetic force, the lines of force will tend to be crowded together as they are pushed out and, in the event the crowded areas exceed the mentioned critical field strength in a given area, that area will be prevented from becoming superconducting and will be in the nature of a permeable "hole" in the otherwise non-permeable plate. The divided flux paths provided by pole pieces 14 and 15 between the poles of permanent magnet 12 serve to minimize the creation of such "holes" in either of the plates 32, 37 when becoming superconducting by providing a shorter flux path through the other of the plates and thereby alleviating the crowding condition which would cause the holes.

The iris mechanism 75 is automatically adjusted by servo motor 78 to vary the amount of radiation entering converter 10 so as to accommodate changes in environmental conditions, particularly regarding the intensity of radiation to which the device is exposed. For example, if plates 32 and 37 receive more heat during their light periods than can be removed therefrom by radiation or by the refrigeration means 35 during their dark periods, they will be prevented from undergoing transition to their superconducting state and the electrical output of the converter will cease.

Referring more particularly to the diagram in FIG. 2, a portion of the electrical output of leads 30 and 31 is passed through the primary winding 105 of a transformer 106. The secondary winding 107 has one lead thereof grounded and the other lead 109 connected to rectifiers 110 and 111. The polarities of rectifiers 110 and 111 are arranged as shown to provide a half wave charging current for each of a pair of storage batteries 112 and 113 connected between the rectifiers and ground.

When converter 10 is operating normally, an alternating current signal of a frequency determined by chopper wheel 65 is fed by conducting means 115 from the converter to a bistable multi-vibrator 116. Multi-vibrator 116 is connected by conductor means 117 to the negative side of battery 113 and acts as a switch in response to the alternating current signal to provide an output in conductor 118 represented by wave form 119 in which zero potential is representative of half cycles of generator output of one polarity while a negative 10 v. potential is representative of generator half cycles of the other potential. Smoothing means in the form of a resistance 120 and a capacitor 121 are connected to conductor 118 and serve to maintain an average minus 5 v. potential at lead 122 of potentiometer 123. Lead 124 of potentiometer 123 is connected to the positive side of battery 112. Potentiometer 123 is provided with a wiper 125, the potential of which will be representative of the difference between the opposing potentials of lead 122 and battery 112. Wiper 125 is connected by suitable conducting means 126 to a power amplifier 127 and is adjusted to provide a zero signal to that amplifier when converter 10 is operating in a normal manner. Amplifier 127 is connected by conductor means 128 to servo motor 78 and is adapted to cause servo motor 78 to shift slide 76 to vary the quantity of radiation entering converter 10 in accordance with changes in the operation thereof. Thus, so long as converter 10 is operating normally, a zero potential exists at potentiometer wiper 125 and amplifier 127 causes servo motor 78 to hold slide 76 against movement.

In the event the radiation increases to the extent that the niobium plates 32 and 37 are prevented from entering the superconducting state, the converter action will cease with the last output being in the form of either the negative or the positive half cycle and multi-vibrator 116 will provide a continuous output of either zero voltage or a negative 10 v. in conductor 118 and, for example, it will be assumed that cessation of the converter in the superconductive state corresponds to a continuous minus 10 v. output from the multi-vibrator. This constant negative potential will be relatively unaffected by smoothing resistor 120 and condenser 121 therefore impressing a negative potential of approximately minus 10 v. on potentiometer 123 and resulting in a negative 5 v. signal at wiper 125. This signal is carried by conductor 126 to amplifier 127 which causes servo motor 78 to move slide 76 in the direction to reduce the radiation falling on plates 32 and 37. When slide 76 has moved a sufficient amount, plates 32 and 37 will again become superconducting in an alternating manner and the output of multi-vibrator 96 will be returned to its normal pulsating output which is averaged by the smoothing means and impressed on potentiometer 123 to provide a zero signal at wiper 125 and amplifier 127, thereby halting operation of servo motor 78 and movement of slide 76.

It will be recognized that in the event radiation falling on plates 32 and 37 is reduced, such as by a changing attitude of the converter with respect to the sun, the plates will fail to be driven from their superconducting states and the converter will cease to function during a positive half cycle causing the output of multi-vibrator 116 to remain at zero. Accordingly a positive potential will be impressed on potentiometer wiper 125 and transmitted as a signal to amplifier 127 via conductor 106. Thereupon amplifier 127 will cause servo motor 78 to actuate slide 76 in a sense to admit a greater amount of radiation until the plates 32 and 37 are again alternated between normal and superconducting states. At that time the generator will again have an alternating current output which will cause multi-vibrator 116 again to provide an output which results in a zero potential at potentiometer wiper 125 thereby halting further movement of slide 76.

By reversing the direction of the windings of one of the sets of coils 20, 21 or 22, 23, it will be recognized that the current flow in the output conductors 30, 31 and load L resulting from the transition of element 32 from superconducting to normal state would be in the same direction as current flow resulting from transition of element 37 from superconducting to its normal state. The output of the apparatus would therefore be in the form of more or less continuous D.C. current.

It will be recognized that suitable reverse polarity switches could be employed to selectively condition the apparatus for either D.C. or A.C. output operation. In addition, more than two superconductive elements and their associated coils and pole pieces could be employed to suit the demands of the use of the current output, the foregoing embodiment being by way of example to provide an understanding of the manner in which the invention may be practiced.

Although plates 32 and 37 may be of solid niobium metal, they are preferably in the form of a thin film of niobium or other superconductive material deposited on a supporting plate of quartz or the like. By so doing, the transitions between normal and superconductive states may be effected with minimum transfers of heat. Of course, it will be understood that, while the described apparatus is particularly adapted to the generation of electricity from the heating effects of either direct or indirect radiation from the sun or other stars, heat energy from other sources such as gas burners or the like may be utilized. Moreover, it will be recognized that at high frequencies other chopper means than wheel 65 may be employed, as for example, the well known Kerr cell.

From the foregoing detailed description of this invention it will be appreciated that there has been provided thereby a novel and useful apparatus for converting thermal energy into electrical energy. It will also be appreciated that the apparatus described as one embodiment of the invention has provided the means whereby the invention may be practiced for the generation of electricity in space devices by employing stellar radiations as a heat source and the inherent coldness of space environments as a heat sink.

Although the invention has been described in considerable detail and with reference to a specific apparatus and mode of practice, it is understood that the invention is not limited thereto, but rather the invention includes all those modifications, adaptations, and uses as are reasonably embraced by the scope of the claims hereof.

Having thus described my invention, I claim:

1. An electric current generator comprising magnet means having a flux path between the poles thereof, said poles being of opposite magnetic polarity, a pole piece defining a portion of said path, an induction coil disposed about said pole piece, an element capable of transition between a normal permeable state and a superconducting relatively nonpermeable state disposed in said flux path, and means for alternatively subjecting said element to heat and cold so as to alternate between said states and decrease and increase the effective length of said flux path, whereby said coil is subjected to an expanding and collapsing magnetic field.

2. An electric generator as defined in claim 1 wherein the means for alternatively subjecting said element to heat and cold comprises a chopper means for intermittently shielding said element from radiation.

3. An electric current generator of the character described comprising a magnet having opposed poles, first and second pairs of pole pieces defining portions of first and second flux paths between said poles, each of said pairs of poles being of opposite magnetic polarity, induction coil means disposed about at least one of said pole pieces and subjected to a magnetic field attendant the flow of magnetic flux through said pole pieces, first and second elements capable of transition to a superconductive state disposed in said first and second flux paths respectively, and chopper means arranged to alternately shield said first and second elements from radiation, whereby said elements may be intermittently and alternately cooled to a superconducting state and heated to a normal state for alternatively lengthening and shortening the effective lengths of said first and second flux paths and varying the magnetic field to which said coil means is subjected.

4. A generator as defined in claim 3 and wherein said first and second elements each comprise a plate of niobium metal.

5. A generator as defined in claim 3 and comprising refrigeration means whereby said cooling is effected at least in part by radiation from said elements and in part by said refrigeration means.

6. A thermo-electric energy converter of the character described comprising magnet means having opposed poles, first and second pairs of pole pieces defining portions of first and second flux paths between said poles, each of said pairs of pole pieces being of opposite polarity, induction coil means disposed about said pole pieces and subjected to a magnetic field attendant the flow of magnetic flux through said paths, first and second plates capable of transition to a superconductive state disposed in said first and second flux paths respectively, cooling means for reducing the temperature of said plates below the temperature of transition to superconductance, chopper means arranged to intermittently and alternatively expose said plates to emanations of radiant energy, whereby said plates are alternately driven between their normal and superconductive states and said flux paths are alternatively lengthened and shortened so as to subject said coil means to increases and decreases in magnetic field density and induce a varying electric current therein, and means for maintaining constant the amount of radiation falling on said plates so as to sustain the alternation of said plates between said states.

7. A thermo-electric converter as defined in claim 6 and wherein said cooling means comprises means for bringing a liquified gas into heat exchanging relation to said plates.

8. A thermo-electric converter as defined in claim 6 and wherein the means for maintaining constant the amount of radiation falling on said plates comprises a variable aperture means, drive means for said aperture means, and control means responsive to changes in converter electrical output for actuating said drive means to vary said aperture to compensate for said changes.

9. An electric current generator comprising magnet means having a flux path between the poles thereof, said poles being of opposite magnetic polarity, an induction coil disposed about a segment of said flux path, an element capable of transition between a normal permeable state and a superconducting relatively non-permeable state disposed in said flux path, and means for alternatively subjecting said element to heat and cold so as to alternate between said states and decrease and increase the effective length of said flux path, whereby said coil is subjected to an expanding and collapsing magnetic field, and means for open circuiting said coil during transition of said element from said normal state to said superconductive state.

10. An electric current generator as defined in claim 9, wherein said means for open circuiting said coil comprises means sensitive to said heat energy, and switch means responsive to a predetermined decrease in said energy to open circuit said coil.

11. An electric current generator of the character described comprising a magnet having opposed poles of opposite magnetic polarity, first and second pole pieces defining portions of first and second flux paths between said poles, induction coil means disposed about at least one of said pole pieces and subjected to a magnetic field attendant the flow of magnetic flux through said pole pieces, first and second elements capable of transition to a superconductive state disposed in said first and second flux paths respectively, and chopper means arranged to alternately shield said first and second elements from radiation, whereby said elements may be interimttently and alternately cooled to a superconducting state and heated to a normal state for alternatively lengthening and shortening the effective lengths of said first and second flux paths and varying the magnetic field to which said coil means is subjected, and means for open circuiting said coil means during transition of said element from said normal state to said superconductive state.

12. An electric current generator as defined in claim 11, wherein said means for open circuiting said coil comprises means sensitive to said heat energy, and switch means responsive to a predetermined decrease in said energy to open circuit said coil.

13. An electric current generator of the character described comprising a magnet means having opposed poles of opposite magnetic polarity, first and second pole pieces defining portions of first and second flux paths between said poles, first and second induction coil means disposed about segments of said first and second flux paths respectively and subjected to the magnetic fields attendant the flow of magnetic flux through the respective flux paths, first and second elements capable of transition to a superconductive state disposed in said first and second flux paths respectively, chopper means arranged to alternately shield said first and second elements from radiation whereby said elements may be alternately cooled to a superconducting state and heated to a normal state for alternatively lengthening and shortening the effective lengths of said first and second flux paths and varying the magnetic fields to which said first and second coil means are subjected, and means for open circuiting said first and second coil means during transitions of said first and second elements, respectively, to their superconductive states, whereby said transitions to said superconductive states are under a non-load condition.

14. An electric current generator as defined in claim 13, wherein said means for open circuiting said coil means comprises radiation responsive switch means.

15. An electric current generator as defined in claim 14, wherein said switch means comprise first and second switch means for alternatively connecting said first and second coil means to a load during transitions of said first and second elements respectively to their normal states.

References Cited
UNITED STATES PATENTS

| | | | |
|---|---|---|---|
| 2,979,668 | 4/1961 | Dunlap | 338—32 X |
| 3,005,117 | 10/1961 | Buchhold | 310—49 X |
| 3,096,467 | 7/1963 | Angus et al. | 318—138 |
| 3,149,246 | 9/1964 | Mason | 310—4 |
| 3,156,850 | 11/1964 | Walters | 317—158 |
| 3,167,663 | 1/1965 | Melingailis et al. | 340—173 |

MILTON O. HIRSHFIELD, *Primary Examiner.*

J. J. SWARTZ, J. D. TRAMMELL, *Assistant Examiners.*